United States Patent
Matsubara et al.

(10) Patent No.: US 11,162,151 B2
(45) Date of Patent: *Nov. 2, 2021

(54) TUBE BODY THAT IS TO BE USED IN HIGH-TEMPERATURE ATMOSPHERE AND METHOD FOR FORMING METAL OXIDE LAYER ON INNER SURFACE OF TUBE BODY

(71) Applicant: KUBOTA CORPORATION, Osaka (JP)

(72) Inventors: Motoyuki Matsubara, Hirakata (JP); Kunihide Hashimoto, Hirakata (JP); Hiroshi Yamaguchi, Hirakata (JP); Masayuki Tomita, Hirakata (JP)

(73) Assignee: KUBOTA CORPORATION, Osaka (JP)

( * ) Notice: Subject to any disclaimer, the term of this patent is extended or adjusted under 35 U.S.C. 154(b) by 469 days.

This patent is subject to a terminal disclaimer.

(21) Appl. No.: 16/099,595

(22) PCT Filed: Oct. 4, 2017

(86) PCT No.: PCT/JP2017/036071
§ 371 (c)(1),
(2) Date: Nov. 7, 2018

(87) PCT Pub. No.: WO2018/088070
PCT Pub. Date: May 17, 2018

(65) Prior Publication Data
US 2019/0127816 A1    May 2, 2019

(30) Foreign Application Priority Data
Nov. 9, 2016 (JP) .............................. JP2016-219087

(51) Int. Cl.
*C21D 8/10* (2006.01)
*B22D 29/00* (2006.01)
(Continued)

(52) U.S. Cl.
CPC ............... *C21D 8/10* (2013.01); *B22D 29/00* (2013.01); *B23K 35/30* (2013.01); *C22C 19/05* (2013.01);
(Continued)

(58) Field of Classification Search
CPC ...... B22D 29/00; B23K 35/304; C21D 6/004; C21D 8/10; C22C 19/05; C22C 38/40; C23C 8/10; C23C 8/14
(Continued)

(56) References Cited

U.S. PATENT DOCUMENTS 8,808,867 B2   8/2014   Deutsch et al.
8,906,511 B2   12/2014  Deutsch et al.
(Continued)

FOREIGN PATENT DOCUMENTS

EP   2 397 573 A1   12/2011
EP   3 2393 11 A1   12/2015
(Continued)

OTHER PUBLICATIONS

Toshio Sugibayashi, "Evaluation of Properties on Shotblasted Surface Texture", Amada Foundation International Fellowship Report, No. 24, p. 149-154, Mar. 2012 (No English language or machine translation available).
(Continued)

*Primary Examiner* — Jie Yang
(74) *Attorney, Agent, or Firm* — Eckert Seamans Cherin & Mellott, LLC

(57) ABSTRACT

The present invention provides a tube body that is to be used in a high-temperature atmosphere and a method for stably
(Continued)

forming a metal oxide layer on an inner surface of the tube body at a high area percentage wherein the tube body is constituted by a heat-resistant alloy containing Cr in an amount of 15 mass % or more and Ni in an amount of 18 mass % or more, so that the inner surface has an arithmetic average roughness (Sa) of three-dimensional surface roughness that satisfies 1.5 µm≤Sa≤5.0 µm and a skewness (Ssk) of a surface height distribution that satisfies |Ssk|≤0.30, wherein the heat-resistant alloy may contain Al in an amount of 2.0 mass % or more and the inner surface may have a kurtosis (Sku) of a surface height distribution of the three-dimensional surface roughness that satisfies Sku≥2.5.

6 Claims, 5 Drawing Sheets

(51) Int. Cl.

| | |
|---|---|
| C22C 38/40 | (2006.01) |
| C23C 8/14 | (2006.01) |
| C22C 19/05 | (2006.01) |
| C22C 38/48 | (2006.01) |
| C22C 30/00 | (2006.01) |
| C22C 38/44 | (2006.01) |
| B23K 35/30 | (2006.01) |
| C22C 38/02 | (2006.01) |
| C22C 38/00 | (2006.01) |
| C22C 38/06 | (2006.01) |
| C22C 38/04 | (2006.01) |
| C22C 38/08 | (2006.01) |
| C22C 38/50 | (2006.01) |
| C23C 8/10 | (2006.01) |
| C21D 6/00 | (2006.01) |
| C22C 38/60 | (2006.01) |

(52) U.S. Cl.
CPC .......... *C22C 19/053* (2013.01); *C22C 19/055* (2013.01); *C22C 30/00* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/40* (2013.01); *C22C 38/44* (2013.01); *C22C 38/48* (2013.01); *C22C 38/50* (2013.01); *C23C 8/10* (2013.01); *C23C 8/14* (2013.01); *B23K 35/304* (2013.01); *C21D 6/004* (2013.01); *C22C 19/056* (2013.01); *C22C 38/60* (2013.01)

(58) Field of Classification Search
USPC .......................................................... 148/593
See application file for complete search history.

(56) References Cited

U.S. PATENT DOCUMENTS

| | | | |
|---|---|---|---|
| 2011/0318593 A1 | 12/2011 | Takahaski et al. | |
| 2012/0097289 A1* | 4/2012 | Chun | F16L 9/02 138/177 |
| 2013/0255418 A1* | 10/2013 | Kobayashi | B24C 11/00 74/424.81 |
| 2014/0205802 A1 | 7/2014 | Enjo et al. | |
| 2016/0079455 A1 | 3/2016 | Batano et al. | |
| 2019/0291219 A1* | 9/2019 | Matsubara | B23K 35/3066 |

FOREIGN PATENT DOCUMENTS

| | | |
|---|---|---|
| EP | 3 239 311 A1 | 1/2017 |
| EP | 1 717 330 A1 | 11/2018 |
| EP | 3 444 059 A1 | 2/2019 |
| JP | S63-50726 A | 3/1988 |
| JP | H06-109392 A | 4/1994 |
| JP | 2002-3970 A | 1/2002 |
| JP | 2011-204723 | 10/2011 |
| JP | 2013-198917 | 10/2013 |
| JP | 2013-198917 A | 10/2013 |
| JP | 2013 227655 A | 11/2013 |
| JP | 2014-128728 | 11/2014 |
| JP | 2016-125088 A | 7/2016 |
| JP | 2016 132019 A | 7/2016 |
| JP | 2019-121369 A | 7/2016 |
| JP | 2018-16861 | 2/2018 |
| JP | 2018-109719 A | 7/2018 |
| WO | 2005/078148 A1 | 8/2005 |
| WO | 2007/064288 A1 | 6/2007 |
| WO | 2010/113830 A1 | 7/2010 |
| WO | 2013/141030 A1 | 9/2013 |
| WO | 2016/104417 A1 | 6/2016 |
| WO | 2017/006739 A1 | 1/2017 |
| WO | 2017/179689 A1 | 10/2017 |

OTHER PUBLICATIONS

Japanese Patent Office, "International Search Report" (with English language translation), from corresponding publication WO 2018/088070 A1 (PCT/JP2017/036071), dated Dec. 12, 2017, 4 pp.

Korean Patent Office, "Office Action", from corresponding Korean Patent Application No. 10-2018-7029905, dated Jan. 28, 2021, 6 pp. (no English translation available).

European Patent Office, "extended European search report", from corresponding European Patent Application No. EP 17 86 9411, dated Apr. 1, 2020, 11 pp.

* cited by examiner

F I G. 5
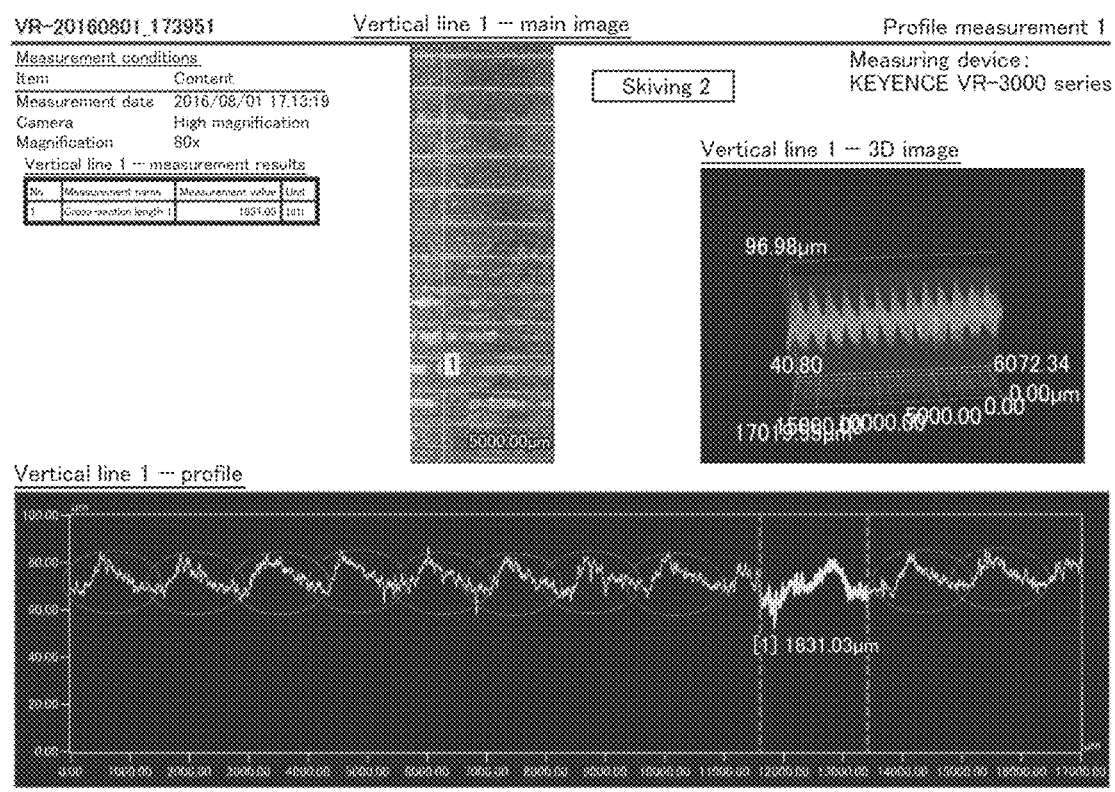

TUBE BODY THAT IS TO BE USED IN HIGH-TEMPERATURE ATMOSPHERE AND METHOD FOR FORMING METAL OXIDE LAYER ON INNER SURFACE OF TUBE BODY

BACKGROUND OF THE INVENTION

Field of the Invention

The present invention relates to a tube body that is to be used in a high-temperature atmosphere and a method for forming, on an inner surface of the tube body, a metal oxide layer mainly containing metal oxides.

Description of Related Art

Olefins such as ethylene and propylene are produced by causing raw material fluid of hydrocarbon gas (naphtha, natural gas, ethane, or the like) to flow through a reaction tube heated from the outside, and thermally cracking the raw material fluid by heating the raw material fluid to a reaction temperature range.

The reaction tube is exposed to a high-temperature atmosphere, and tends to be influenced by oxidation, carburization, nitridization, and the like by the flowing gas, and thus the reaction tube needs to have excellent resistance to these. In view of this, a reaction tube has been developed in which a layer constituted by metal oxides is formed on a tube inner surface that comes into contact with flowing gas, and this metal oxide layer serves as a barrier and protects the tube inner surface in a high-temperature atmosphere.

However, if the metal oxide formed on the tube inner surface is a Cr oxide, the metal oxide layer is low in density and deficient in tight adhesion, and thus the function of sufficiently protecting the tube inner surface cannot be achieved depending on use conditions. Thus, Patent Document 1 proposes a reaction tube having an inner surface provided with an alumina barrier layer that mainly contains an Al oxide as a metal oxide.

The formation of the alumina barrier layer on the tube inner surface makes it possible to realize excellent oxidation resistance, carburization resistance, nitridization resistance, and the like during use in a high-temperature atmosphere.

In order to suitably form an Al oxide on the tube inner surface and suppress the formation of a Cr oxide, surface processing is performed on the tube inner surface in Patent Document 1. Specifically, a surface roughness (Ra) is adjusted to 0.5 μm to 2.5 μm by performing surface processing on the tube inner surface.

CITATION LIST

Patent Document

[Patent Document 1] WO2010/113830

SUMMARY OF THE INVENTION

However, even though a two-dimensional surface roughness (Ra) of the tube inner surface was adjusted in a desired range, an Al oxide was not stably formed in some cases, and the area percentage of the metal oxide layer (alumina barrier layer) varied in some cases.

In view of this, when the inner surfaces of tubes in which the two-dimensional surface roughnesses (Ra) were in a desired range and the area percentages of the alumina barrier layers varied were observed, so-called burrs occurred which are protrusions or recesses caused by a grinding material partially chipping the tube inner surface in surface processing. Moreover, it was found that an Al oxide was not well formed in burr portions. It was understood that the cause is as follows: although an Al oxide is formed by Al in the tube moving toward the inner surface and being oxidized in heat treatment, the movement of Al in these burr portions is inhibited, Al is not sufficiently supplied or spread thereto, and even if Al is supplied to the burr portions, a large amount of Al is consumed due to significant unevenness and a large specific surface area of the burr portions, as a result of which a uniform alumina barrier layer is unlikely to be formed.

An object of the present invention is to provide a tube body that is to be used in a high-temperature atmosphere and a method for stably forming a metal oxide layer on an inner surface of the tube body at a high area percentage.

The tube body according to the present invention is a tube body that is to be used in a high-temperature atmosphere, in which the tube body is constituted by a heat-resistant alloy containing Cr in an amount of 15 mass % or more and Ni in an amount of 18 mass % or more, and on an inner surface, an arithmetic average roughness (Sa) of three-dimensional surface roughness satisfies 1.5≤Sa≤5.0 and a skewness (Ssk) of a surface height distribution satisfies |Ssk|≤0.30.

The heat-resistant alloy may contain Al in an amount of 2.0 mass % or more.

On the inner surface, a kurtosis (Sku) of a surface height distribution of the three-dimensional surface roughness satisfies Sku≥2.5.

The inner surface is provided with a projection through overlay welding, the projection contains Al in an amount of 2.0 mass % or more, and an arithmetic average roughness (Sa) of three-dimensional surface roughness of the projection satisfies 1.5≤Sa≤5.0 and a skewness (Ssk) of a surface height distribution satisfies |Ssk|≤0.30.

It is desirable that a metal oxide layer that mainly contains a metal oxide is formed on the inner surface.

It is desirable that the metal oxide layer is an alumina barrier layer that mainly contains an Al oxide.

A reaction tube for manufacturing an olefin may be constituted by the tube body.

A method for forming an alumina barrier layer containing an Al oxide on the inner surface of the tube body includes:

a surface processing step of performing surface processing on the inner surface of the tube body so that on the inner surface, an arithmetic average roughness (Sa) of three-dimensional surface roughness satisfies 1.5≤Sa≤5.0 and a skewness (Ssk) of a surface height distribution satisfies |Ssk|≤0.30; and a heat treatment step of performing heat treatment on the tube body on which the surface processing was performed, and forming an alumina barrier layer containing an Al oxide on the inner surface of the tube body.

The method may include an overlay welding step of overlay welding, on the inner surface of the tube body, an overlay welding powder containing Al in an amount of 2.0 mass % or more so as to form a projection, the overlay welding step being performed before the surface processing step.

The surface processing step may be blasting.

According to the present invention, the occurrence of burrs on the inner surface of the tube body can be suppressed by adjusting Sa and Ssk of the inner surface of the tube body in the ranges. Accordingly, it is possible to approximately evenly move metal elements (for example, Al) that constitute metal oxides toward the inner surface from the inner portion of the tube body in heat treatment, and thus it is possible to suitably form a metal oxide layer.

Also, although a dimple is formed on a surface of the projection in a tube body to which the projection is overlay welded on the inner surface and such a tube body has inferior smoothness, by setting Sa and Ssk of the projection to be in the above-described ranges, the metal elements constituting metal oxides can be moved from the inner portion to the surface of the projection and a metal oxide layer can be suitably formed.

According to a tube body of the present invention, the formation of a metal oxide layer such as an alumina barrier layer on the inner surface of the tube body and the formation of the alumina barrier layer on the surface of the projection makes it possible to suppress the attachment of coke thereto during use in thermal cracking of hydrocarbon gas, for example, and thus it is possible to prevent pressure loss and a decrease in the heat transfer efficiency, and to also prevent a decrease in the operation efficiency caused by a decoking task.

BRIEF DESCRIPTION OF THE DRAWINGS

FIG. 5 shows a surface image, a 3D image, and a surface profile of Comparative Example 4.

DETAILED DESCRIPTION OF THE INVENTION

Hereinafter, an embodiment of the present invention will be described in detail. Note that unless otherwise stated, "%" means mass %.

Figure 1:
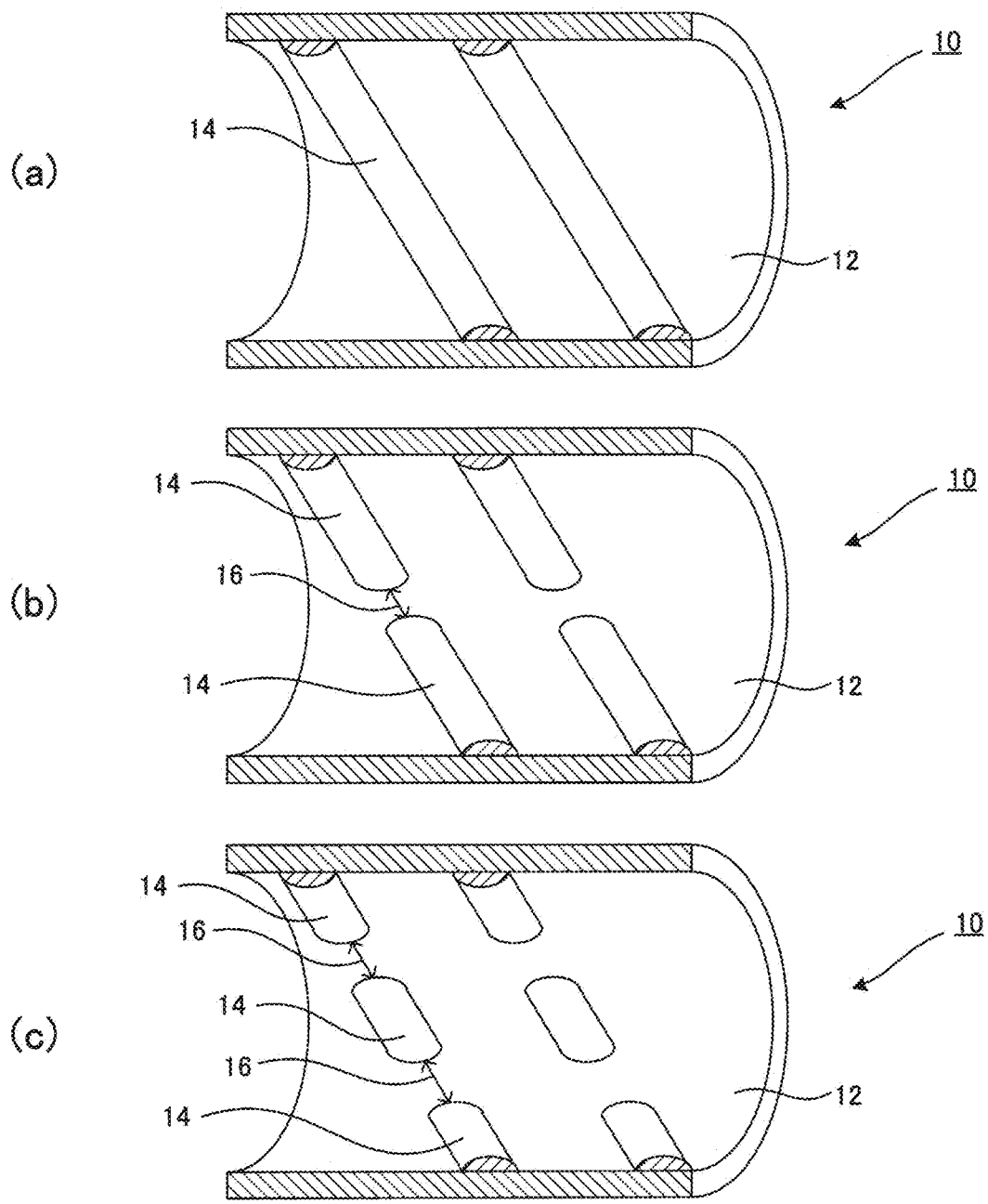
FIG. 1 is a cross-sectional view of a reaction tube provided with an inner surface projection in the tube axis direction according to one embodiment of the present invention.

As shown in FIG. 1, for example, a tube body of the present invention is formed into a tubular shape (tube main body 12), and can be used as a heating furnace for manufacturing hydrocarbon, such as a thermal cracking tube for manufacturing ethylene, a cracking tube for thermally cracking olefin-based hydrocarbon gas, or a cracking tube for thermally cracking a styrene monomer.

The tube body is constituted by a heat-resistant alloy containing Cr in an amount of 15 mass % or more and Ni in an amount of 18 mass % or more. Desirably, the tube body contains Al in an amount of 2.0% to 4.0%. The reason for limiting components are as follows.

Cr: 15% or More

For the purpose of contributing to an increase in the high-temperature strength and oxidation resistance, the alloy contains Cr in an amount of 15% or more. However, if the alloy contains Cr excessively, chromium oxides ($Cr_2O_3$ and the like) are formed with priority and the alumina barrier layer formation is inhibited when the alloy contains Al, and thus it is desirable that the upper limit of Cr is 40%. Note that the Cr content is more desirably 20% to 35%.

Ni: 18% or More

Ni is an element that is needed to ensure carburization resistance, oxidation resistance, and the stability of a metal structure. Also, Ni has a function of improving the alumina barrier layer regeneration ability, and thus the alloy contains Ni in an amount of 18 mass % or more. On the other hand, if the alloy contains Ni in an amount of more than 60%, the effect of the increase is not further improved, and thus the upper limit of Ni is desirably 60%. Note that the Ni content is more desirably 30% to 45%.

Al: 2.0% to 4.0%

Al is a material of the Al oxide that forms the alumina barrier layer. In order to achieve the ability of stably forming and regenerating an alumina barrier layer, it is desirable that the alloy contains Al in an amount of 2.0% or more. On the other hand, if the Al content exceeds 4.0%, these abilities are not further improved, and thus the upper limit of Al is 4.0%. Note that the Al content is more desirably 3.0% to 4.0%.

Note that an example of the material is a material constituted by, as specific constituent elements of the above-described tube body, C in an amount of 0.40% to 0.60%, Si in an amount of more than 0% to 1.0% or less, Mn in an amount of more than 0% to 1.0% or less, Cr in an amount of 15% to 40%, Ni in an amount of 18% to 60%, W in an amount of 0.5% to 2.0%, Nb in an amount of more than 0% to 0.50% or less, Al in an amount of 2.0% to 4.0%, a rare earth element in an amount of 0.05% to 0.15%, Ti in an amount of 0.05% to 0.20%, and Fe and inevitable impurities as a remaining portion. Note that examples of the inevitable impurities include P and S, and the upper limit of these elements is 0.06% in total.

A projection can be formed by overlay welding an overlay welding powder that contains Al in an amount of 2.0% or more, on the inner surface of the tube body. Al is an essential material of the Al oxide that forms the alumina barrier layer, and in order to achieve the ability of stably forming and regenerating an alumina barrier layer, the projection needs to contain Al in an amount of 2.0% or more.

For example, as shown in FIG. 1, an inner surface of a tube main body 12 is provided with projections 14 as stirring members. The projections 14 can be formed by overlay welding a powder for overlay welding, which will be described later, on the inner surface of the tube main body 12. As shown in FIG. 1(a), the projections 14 can be formed as continuous helical projection columns. The number of projection columns can be one or more. Also, FIGS. 1(b) and 1(c) show the shape in which slits 16 are provided between the projections 14. The slits 16 may be also provided such that they are parallel in the tube axis direction in the adjacent projection columns, or the slits 16 in adjacent projection columns may be shifted in the circumferential surface direction of the tube main body 12. The projections 14 are not limited to being formed as the helical projection columns, and may be formed in an orientation that is perpendicular to the tube axis.

Due to the projections 14 being formed on the inner surface of the tube main body 12, hydrocarbon gas that flows through the inner portion of the tube main body 12 generates a swirl flow that circulates around the circumferential edges of the projections 14 when hydrocarbon gas passes over the projections 14, and due to the hydrocarbon gas being stirred, heat can be exchanged between hydrocarbon gas and the tube main body 12, and the thermal cracking efficiency of the reaction tubes 10 can be increased as much as possible.

The projections 14 can be formed as overlay beads using an overlay welding method such as PPW (plasma powder welding) or powder plasma transferred arc welding (PTA welding) by welding a powder for overlay welding having the following composition on the inner surface of the tube main body 12.

An example of the material is a material containing C in an amount of 0.2% to 0.6%, Si in an amount of more than 0% to 1.0%, Mn in an amount of more than 0% to 0.6% or less, Cr in an amount of 25% to 35%, Ni in an amount of 35% to 50%, Nb in an amount of 0.5% to 2.0%, Al in an amount of 3.0% to 6.0%, Y in an amount of 0.005% to 0.05%, and Fe and inevitable impurities as a remaining portion as desirable constituent elements of the overlay welding powder. Moreover, use of this powder for overlay welding forms the projections 14 having the same components. Note that examples of the inevitable impurities include P and S, and the upper limit of these elements is 0.01% in total.

The reason for limiting the components of the projections is as follows.

C: 0.2% to 0.6%

C has the function of increasing high-temperature creep rupture strength. Thus, the projections contain C in an amount of at least 0.2%. However, if the content is excessively large, the primary carbide $Cr_7C_3$ tends to be widely formed in the projections, the movement of Al in the base material that forms the alumina barrier layer is suppressed, and thus Al is insufficiently supplied to the surface portion of the projections, local tearing of the alumina barrier layer occurs, and the continuity of the alumina barrier layer is impaired. Thus, the upper limit of C is 0.6%. Note that the C content is more desirably 0.3% to 0.5%.

Si: More than 0% to 1.0% or Less

The projections contain Si as a deoxidant in order to increase the fluidity of the material during welding. However, if the projections contain Si excessively, the high-temperature creep rupture strength decreases and Si is oxidized so as to cause the formation of an oxide layer with a low denseness, and the weldability decreases, and thus the upper limit of Si is 1.0%. Note that the Si content is more desirably 0.6% or less.

Mn: More than 0% to 0.6% or Less

Although the projections contain Mn as a deoxidant for a molten alloy in order to fix S in molten metal, if the projections contain Mn excessively, a $MnCr_2O_4$ oxide film is formed and the high-temperature creep rupture strength decreases, and thus the upper limit of Mn is 0.6%. Note that the Mn content is more desirably 0.3% or less.

Cr: 25% to 35% For the purpose of contributing to an increase in the high-temperature strength and oxidation resistance, the projections contain Cr in an amount of 25% or more. However, if the projections contain Cr excessively, chromium oxides ($Cr_2O_3$ and the like) are formed and the alumina barrier layer formation is inhibited, and thus the upper limit of Cr is 35%. Note that the Cr content is more desirably 27% to 33%.

Ni: 35% to 50%

Ni is an element that is needed to ensure carburization resistance, oxidation resistance, and the stability of a metal structure. Also, Ni has a function of improving the ability of regenerating an alumina barrier layer. Also, if the Ni content is low, the Fe content increases relatively, as a result of which a Cr—Fe—Mn oxide tends to be produced on the surface of the projections, and thus the production of the alumina barrier layer is inhibited. Thus, the projections contain Ni in an amount of at least 35% or more. On the other hand, if the projections contain Ni in an amount of more than 50%, the effect of the increase is not further improved, and thus the upper limit of Ni is 50%.

Note that the Ni content is more desirably 38% to 47%.

Nb: 0.5% to 2.0%

Nb suppresses the occurrence of weld cracks and forms NbC so as to increase the creep strength, and thus the projections contain Nb in an amount of 0.5% or more. On the other hand, if Nb is excessing contained, the alumina barrier layer becomes more likely to spall off, and thus the upper limit of Nb is 2.0%. Note that the Nb content is more desirably 1.0% to 1.5%.

Al: 3.0% to 6.0%

Al is an essential material of the Al oxide that forms the alumina barrier layer. In order that the projections 14 exhibit the ability of stably forming and regenerating the alumina barrier layer, the projections contain Al in an amount of 3.0% or more. On the other hand, if the Al content exceeds 6.0%, these abilities are not further improved, and thus the upper limit of Al is 6.0%. Note that the Al content is more desirably greater than 3.0% and less than 5.0%.

Y: 0.005% to 0.05%

In order to suppress meandering of weld beads and increase the weldability during overlay welding, Y is added in an amount of 0.005% or more. On the other hand, if the Y content exceeds 0.05%, the ductility of the projections 14 will decrease, and thus the upper limit of Y is 0.05%. Note that the Y content is more desirably 0.01% to 0.03%.

Note that it is desirable that the projections contain Y in an amount of 0.002 times or more the Al content. That is, Y/Al≥0.002 holds true. Accordingly, Y can compensate for a decrease in the weldability, which is inhibited due to the addition of Al. Note that if rare earth elements that are shown below are further added thereto, it is desirable that (Y+rare earth elements)/Al≥0.002 holds true.

Moreover, the following elements can be added to the overlay welding material.

Rare Earth Elements: 0.01% to 0.20%

"Rare earth elements" mean the 15 types of lanthanoid from La to Lu in the periodic table. The rare earth elements preferably mainly include La, and it is desirable that La makes up 80% or more of the rare earth elements, and desirably makes up 90% or more of the rare earth elements. The rare earth elements contribute to the ability of stably forming the alumina barrier layer, and thus the alloy for overlay welding contains the rare earth elements in an amount of 0.01% or more. On the other hand, if the content of rare earth elements exceeds 0.20%, this ability is not further improved, and thus the upper limit thereof is 0.20%. Note that the content of the rare earth elements is more desirably greater than 0.01% and 0.10% or less.

One or more elements selected from the group consisting of W in an amount of more than 0% to 2.0% or less, Mo in an amount of more than 0% to 1.0% or less, Ti and/or Zr in a total amount of more than 0% to 0.5% or less, and Hf in an amount of more than 0% to 0.5% or less These elements have the effect of increasing the carburization resistance, and are added in order to improve high-temperature strength. However, excessive addition thereof will reduce the ductility and the like, and thus the content is as specified above.

The tube body of the present invention can be manufactured in the following manner, for example.

The tube body is cast into a tubular shape by smelting molten metal having the above-described component composition, and through centrifugal casting, static casting, or the like. The present invention is particularly suitable for a tube main body produced through centrifugal casting. The reason is as follows: by applying centrifugal casting, a minute metal structure grows with an orientation in the diameter direction as cooling using a mold progresses, and an alloy structure in which metal elements (for example, Al) that form a metal oxide layer easily move can be obtained. Accordingly, in heat treatment, which will be described later, it is possible to obtain the tube main body 12 provided with an oxide film having an excellent strength even in an environment in which the tube body is repeatedly heated, even though the oxide film is a thin metal oxide layer (for example, an alumina barrier layer).

<Machining>

After the obtained tube body is cut to a predetermined dimension and bending is corrected by unbending, rough processing is performed on the inner surface and edge preparation for welding is performed on an end portion.

<Overlay Welding for Projections>

Powder for overlay welding having the above-described composition is overlay welded on the inner surface of the tube body through PPW, PTA welding, or the like. The powder for overlay welding contains Y in the above-described range, and thus meandering of the weld beads is suppressed and the powder for overlay welding has a good weldability. Accordingly, the projections are formed on the inner surface of the tube body. For example, as shown in FIG. 1, reaction tubes 10 can be obtained by overlay welding the projections 14 on the inner surface of the tube main body 12. Note that if it is not necessary to form projections on the inner surface of the tube body, this process is not needed.

<Surface Processing Step>

Surface processing is performed on the inner surface of the tube body, and if projections are formed, surface processing is performed on the inner surface of the tube body and the surfaces of the projections (these are collectively referred to as "the surfaces of the tube body" hereinafter). Examples of surface processing include blasting and honing. Note that in the case of honing, it is desirable to perform boring and skiving as preprocessing. If projections are formed, it is sufficient to carry out boring and skiving before formation of the projections.

Surface processing is carried out such that on the surfaces of the tube body, an arithmetic average roughness (Sa) of three-dimensional surface roughness satisfies $1.5 \leq Sa \leq 5.0$ and a skewness (Ssk) of a surface height distribution satisfies $|Ssk| \leq 0.30$. Sa desirably satisfies $2.5 \leq Sa \leq 4.0$. Also, Ssk desirably satisfies $|Ssk| \leq 0.20$.

By processing the surfaces of the tube body as described above, it is possible to suppress the occurrence of burrs on the surfaces of the tube body that are caused by surface processing, and to apply residual stress caused by the surface processing to the surfaces of the tube body. Accordingly, in the following heat treatment, the size of crystals directly below the surfaces is reduced at the time of recrystallization at a high-temperature, metal elements (for example, Al) that approximately evenly form a metal oxide layer tend to move to the surface, the above-described metal elements can be concentrated on the surface of the tube body, and the metal oxide layer containing metal oxides can be formed on the surfaces of the tube body at a high area percentage.

If $Sa \geq 5.0$ and $|Ssk| \geq 0.30$ hold true for Sa and Ssk, burrs are present on the surfaces of the tube body. The metal elements that form metal oxides in the burr portions are not concentrated on the surfaces, the metal oxides are formed inside the tube body, metal oxides are not well formed on the surfaces, and the area percentage of the metal oxide layer decreases. Also, it is thought that even though the metal elements that form the metal oxides move to the surfaces, the burr portion has a large specific surface area, and thus the supplied metal elements are dispersed, these metal elements cannot be concentrated, and thus sufficient metal oxides are not formed.

On the other hand, if $Sa < 1.5$ holds true, sufficient residual stress cannot be applied to the surfaces of the tube body through surface processing, the metal elements that form metal oxides are unlikely to be concentrated on the surfaces even through heat treatment, and thus metal oxides cannot be sufficiently formed. Therefore, with regard to Sa, $Sa \geq 1.5$ preferably holds true, and $Sa \geq 2.5$ desirably holds true.

Note that on the surfaces of the tube body, it is desirable that the kurtosis (Sku) of the surface height distribution of the three-dimensional surface roughness satisfies $Sku \geq 2.5$. The state in which $Sku \geq 2.5$ is a state in which the surface height distribution is in a slightly sharp state, and by setting Sku to be more than 2.5, it is possible to check the frequency and the concentration of burrs. Note that it is desirable that Sku satisfies $Sku \geq 3.0$.

<Heat Treatment>

The tube body is subjected to heat treatment in an oxidizing atmosphere (in an oxidizing environment in which oxidizing gas or steam containing oxygen in an amount of 20 vol % or more, or $CO_2$ are mixed) after the above-described surface processing is performed on the surfaces of the tube body, and thereby a metal oxide layer (for example, the alumina barrier layer) is formed on the inner surface of the tube body (if projections are formed, the surfaces of the projections are included). Note that this heat treatment can be implemented as an independent process, or can be implemented also in a high-temperature atmosphere when the tube body is installed and used in the heating furnace.

By performing heat treatment, the surfaces of the tube body come into contact with oxygen, and Al, Cr, Ni, Si, and Fe that are distributed on the surface of the base are oxidized so as to form a metal oxide layer. If the inner surface of the tube body (if projections are formed, the surfaces of the projections are included) contains Al, by performing heat treatment at a suitable temperature range of 800° C. or more for one hour or more, Al forms oxides ($Al_2O_3$) with priority over Cr, Ni, Si, and Fe, and an alumina barrier layer that mainly contains an Al oxide is formed.

The tube body of the present invention is capable of maintaining excellent oxidation resistance, carburization resistance, nitridization resistance, and corrosion resistance during use in a high-temperature atmosphere due to the metal oxide layer formed on the inner surface and the surfaces of the projections if the projections are formed. Thus, it is possible to significantly increase the lifetime of the reaction tubes 10 in which the tube body of the present invention is used as the tube main body 12 and to increase the operation efficiency as much as possible. The tube body of the present invention is suitable as a reaction tube for manufacturing an olefin whose operation temperature is about 700° C. to 800° C., and a reaction tube for manufacturing a styrene monomer whose operation temperature is about 500° C. to 600° C.

WORKING EXAMPLES

A molten alloy having the composition of the present invention was smelted through atmospheric melting in a high-frequency induction furnace, and sample materials (Inventive Examples 1 to 7, and Comparative Examples 1 to 6) were produced by performing centrifugal casting and performing rough processing on the surfaces. Surface processing shown in Tables 1 and 2 was performed on the surfaces of the obtained sample materials.

TABLE 1

| Sample materials | Surface processing | Sa | Ssk | Sku | Ra | Area percentage |
|---|---|---|---|---|---|---|
| Inventive Ex. 1 | blast | 2.94 | −0.17 | 3.41 | 1.87 | more than 90% |
| Inventive Ex. 2 | blast | 2.64 | −0.05 | 3.26 | 1.85 | more than 90% |
| Inventive Ex. 3 | blast | 2.61 | −0.15 | 3.37 | 1.99 | more than 90% |
| Inventive Ex. 4 | blast | 2.60 | −0.07 | 3.28 | 2.10 | more than 90% |
| Inventive Ex. 5 | 2 cut + honing | 3.09 | −0.19 | 3.66 | 1.65 | more than 90% |
| Inventive Ex. 6 | 2 cut + honing | 3.82 | 0.23 | 2.63 | 1.15 | more than 90% |
| Inventive Ex. 7 | 2 cut + honing | 2.82 | 0.08 | 2.50 | 1.10 | more than 90% |
| Comp. Ex. 1 | mirror-polishing | 1.10 | −0.30 | 4.42 | 1.05 | 10% or less |
| Comp. Ex. 2 | #1000 paper | 1.18 | −0.05 | 4.20 | 1.02 | 50% or less |
| Comp. Ex. 3 | Skiving 1 | 7.23 | −0.29 | 3.46 | 2.85 | 70% or less |
| Comp. Ex. 4 | Skiving 2 | 3.57 | 0.35 | 2.54 | 1.63 | 80% or less |
| Comp. Ex. 5 | 1 cut + honing | 3.66 | −1.24 | 7.05 | 1.59 | 90% or less |
| Comp. Ex. 6 | 1 cut + honing | 3.52 | −1.48 | 6.68 | 1.62 | 90% or less |

TABLE 2

| Surface processing | Boring | Skiving | Honing | Blast | Polish |
|---|---|---|---|---|---|
| mirror-polishing | ✓ | | | | ✓ |
| #1000 paper | ✓ | | | | ✓ |
| Skiving 1 | ✓ | ✓ | | | |
| Skiving 2 | ✓ | ✓ | | | |
| 1 cut + honing | ✓ | | ✓ | | |
| blast | ✓ | | | ✓ | |
| 2 cut + honing | ✓ | ✓ | ✓ | | |

The details of the surface processing in Table 1 are listed in Table 2. With regard to the processes in Table 2, the surface processing that was performed on the sample materials is checked. In all of the surface processes, "boring" processing was performed on the surfaces of the sample materials through cutting processing. The details of the other processes are as follows.

"Mirror-polishing" is processing in which buff polishing is performed using a polishing material having a fine powder form. "#1000 paper" is processing in which a surface is polished using sandpaper #1000. "Skiving" is cutting processing, and "Skiving 1" and "Skiving 2" differ from each other in tip shape and the rotation rate of a processing tool. "Honing" is grinding processing. "Blast" is blasting in which alumina having an average particle size of 60 μm is ejected as a grinding material. "2 cut+honing" refers to performing honing after boring processing and skiving processing are performed.

With regard to the sample materials on which surface processing was performed, the surface roughnesses and surface profiles of regions of the surfaces having a size of 20 mm×10 mm or more were measured using a one-shot 3D measuring microscope VR-3100 (manufactured by KEYENCE CORPORATION). Measurement was made under measurement conditions where with regard to an area of approximately 20 mm×approximately 7 mm, magnification was 80-fold, a super fine mode and a depth synthesis mode were used, a double-side lighting was used, and automatic image compositing was utilized.

The arithmetic average roughness (Sa) of the three-dimensional surface roughness, the skewness (Ssk) of the surface height distribution, and the kurtosis (Sku) of the surface height distribution of each of the obtained sample materials are listed in Table 1. Also, for comparison, the results of measurement of the surface roughness (Ra) are collectively listed in Table 1.

Referring to Table 1, the inventive examples and the comparative examples all satisfied 1.5≤Sa≤5.0, except for Comparative Examples 1 to 3. Comparative Examples 1 and 2 satisfied Sa<1.5, but in Comparative Example 3, Sa>5.0 held true.

Also, with regard to Ssk, all of the inventive examples and Comparative Examples 1 to 3 satisfied |Ssk|≤0.30, but in Comparative Examples 4 to 6, |Ssk|>0.30 held true.

With regard to Sku, all of the sample materials satisfied Sku≥2.5.

On the other hand, the two-dimensional surface roughnesses (Ra) were all in a range of 1.0 to 2.5 μm, except for Comparative Example 3 on which Skiving 1 was performed, and no significant difference caused by a difference in surface processing was found.

Figure 2:
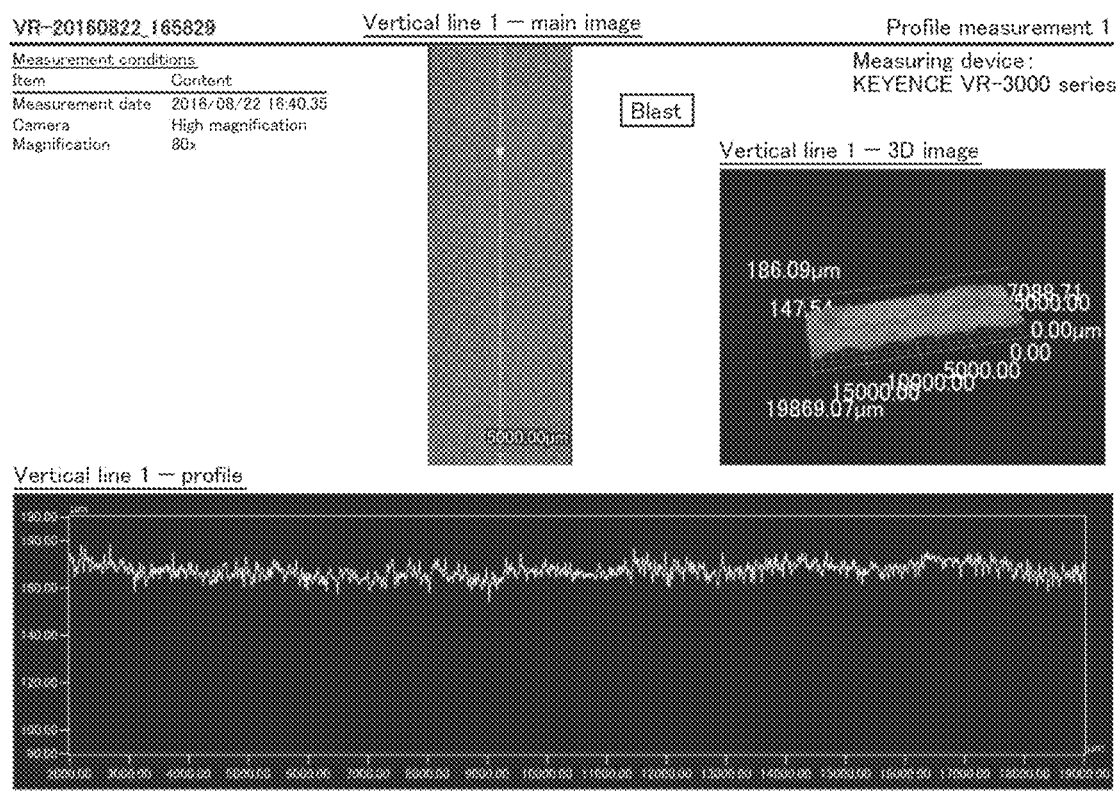
FIG. 2 shows a surface image, a 3D image, and a surface profile of Inventive Example 2.
Figure 3:
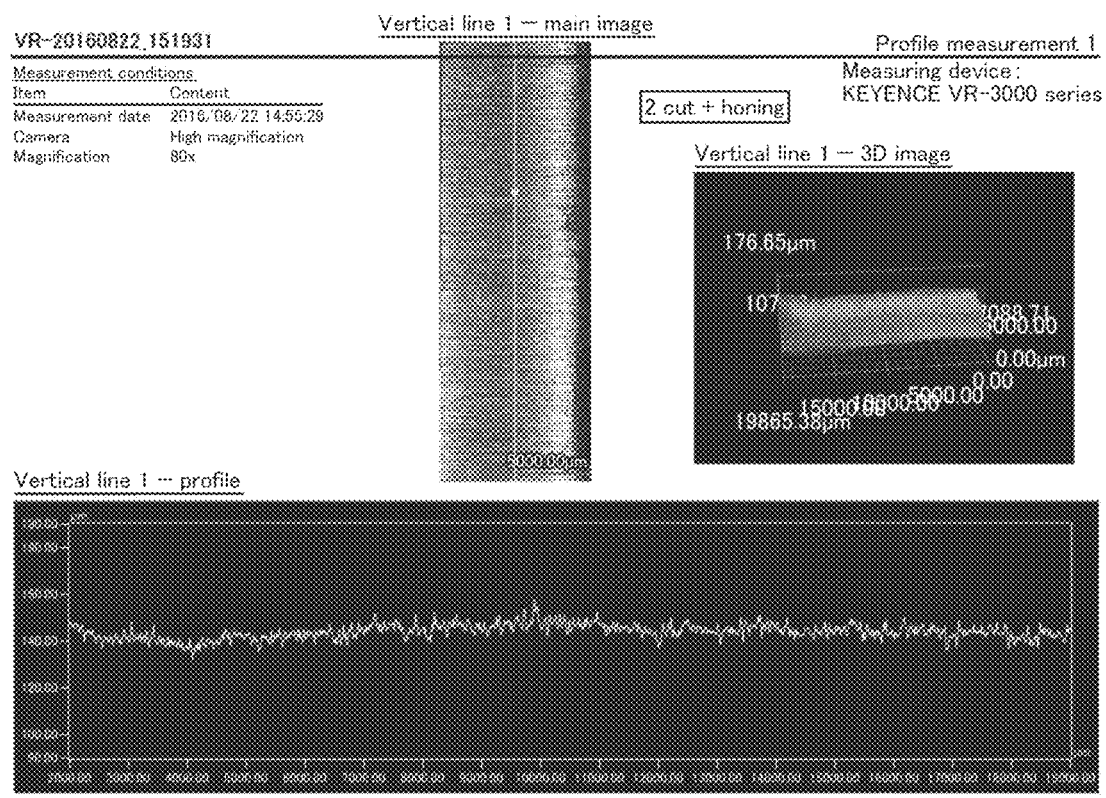
FIG. 3 shows a surface image, a 3D image, and a surface profile of Inventive Example 5.
Figure 4:
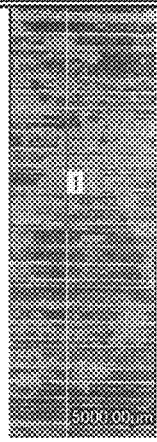
FIG. 4 shows a surface image, a 3D image, and a surface profile of Comparative Example 3.
Figure 4:
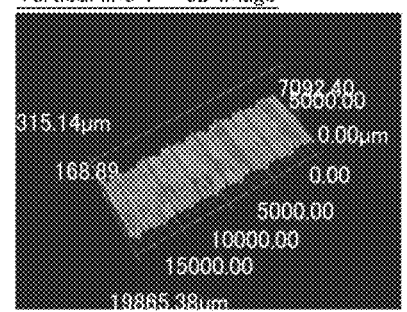
Figure 4:
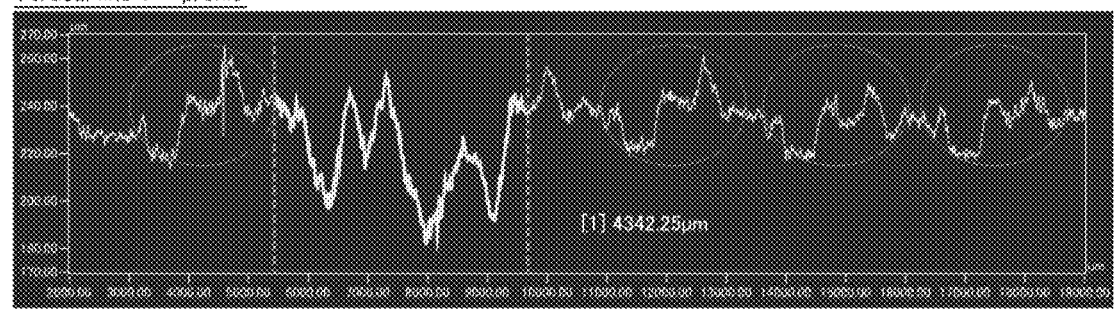

For reference, surface images, 3D images, and surface profiles for Inventive Examples 2 and 5, and Comparative Examples 3 and 4 are shown in FIGS. 2 to 5. FIG. 2 shows Inventive Example 2, FIG. 3 shows Inventive Example 5, FIG. 4 shows Comparative Example 3, and FIG. 5 shows Comparative Example 4.

Referring to FIGS. 2 and 3, it is found that no burrs were found on the surfaces in both Inventive Examples 2 and 5, and those surfaces had a substantially constant unevenness shape. On the other hand, referring to FIGS. 4 and 5, in a regular pattern enclosed by circles in FIGS. 4 and 5, regions that are sectioned using dotted lines were recessed significantly, and the occurrence of burrs in which many small protrusions were present was confirmed in those recesses. It is thought that the burrs result from a material cut by a cutting edge during boring or skiving chipping portions of an uncut material, these portions undergoing plastic deformation, and being pulled, resulting in ductile fracture.

The sample materials on which surface processing was performed were subjected to heat treatment in an oxidizing atmosphere so as to form an alumina barrier layer containing an Al oxide on the surfaces. Moreover, with regard to regions having a size of 1.35 mm×1 mm of the surfaces of the sample materials, the Al oxide distribution states were measured through surface analysis using a SEM/EDX measuring tester. The results are listed in Table 1 above.

Referring to Table 1, in all of the inventive examples, the area percentage of the Al oxide exceeded 90%. This means that with regard to the inventive examples, Sa and Ssk are in ranges prescribed in the present invention, and thus the occurrence of the burrs on the surfaces of the sample materials was suppressed. Moreover, accordingly, in the inventive examples, it is possible to approximately evenly move Al from the inner portion of the tube body toward the inner surface during heat treatment and to suitably form an alumina barrier layer.

On the other hand, in all of the comparative examples, the area percentage of the Al oxide was 90% or less. It is thought that in Comparative Examples 1 and 2, Sa became less than 1.5, which is excessively small, through mirror-polishing and #1000 paper processing, and as a result of which sufficient residual stress was not applied to the inner surface of the tube body through the surface processing, Al was unlikely to be concentrated on the surfaces even through heat treatment, and an Al oxide was not sufficiently formed. Comparative Example 3 satisfied Sa>5.0, and Ra also exceeded 2.5, which is a criterion. It is thought that the reason is as follows: processing warping excessively remains, whereby a Cr oxide scale tends to be produced. Also, Comparative Examples 4 to 6 satisfied |Ssk|>0.30, burrs were present on the surfaces of the sample materials, Al was not concentrated on the surfaces in the burr portions, an aluminum oxide was formed in the sample materials, and thus an Al oxide was not well formed on the surfaces. Moreover, it is thought that the burr portions had a large specific surface area, and thus supplied Al was dispersed, Al was not concentrated, and an Al oxide was not sufficiently formed.

In particular, Inventive Examples 5 to 7 with "2 cut+ honing" and Comparative Examples 5 and 6 with "1 cut+ honing" differ only in whether or not skiving is performed. However, those inventive examples satisfied |Ssk|≤0.25, but in those comparative examples, |Ssk|>0.25 held true, and thus the comparative examples were inferior to the inventive examples with regard to the area percentage of the Al oxide as well. It is thought that the reason is as follows: burrs occurred in the comparative examples, and by performing only honing after boring, the burrs occurring through boring were not sufficiently removed through honing.

If projections are overlay welded to the surfaces, it is difficult to perform boring or skiving, which are cutting processes, on projecting portions, and thus it is necessary to perform these processes before the projections are subjected to overlay welding. Thus, no processing is performed on the projections, the surface roughness (Sa) of the projection surfaces increases, and an Al oxide is not well formed. On the other hand, blasting and honing can be performed on the formed projections, and thus Sa and Ssk of the projection surfaces can be adjusted, and an Al oxide can be also suitably formed on the projections.

As described above, it is found that with regard to Ra, no significant difference was found between the inventive examples and the comparative examples, but the area percentage of an Al oxide can be increased by adjusting Sa and Ssk.

The above description is for describing the present invention, and should not be interpreted as limiting or restricting the scope of claims of the present invention. Furthermore, it goes without saying that the configurations of the constituent elements of the present invention are not limited to those in the working examples, and that various modifications are possible within the technical scope of the claims.

What is claimed is:

1. A tube body having an inner surface with a projection formed by overlay welding, wherein the projection has a function of stirring gas that flows through inside of the tube body, wherein the tube body is constituted by a heat-resistant alloy consisting essentially of, in terms of % by mass, C in an amount of 0.40% to 0.60%, Si in an amount of more than 0% to 1.0%, Mn in an amount of more than 0% to 1.0%, Cr in an amount of 15% to 40%, Ni in an amount of 18% to 60%, W in an amount of 0.5% to 2.0%, Nb in an amount of more than 0% to 0.50%, Al in an amount of 2.0% to 4.0%, rare earth elements in an amount of 0.05% to 0.15%, Ti in an amount of 0.05% to 0.20%, the balance Fe and inevitable impurities, wherein the projection is made of a material consisting essentially of, in terms of % by mass, C in an amount of 0.2% to 0.6%, Si in an amount of more than 0% to 1.0%, Mn in an amount of more than 0% to 0.6%, Cr in an amount of 25% to 35%, Ni in an amount of 35% to 50%, Nb in an amount of 0.5% to 2.0%, Al in an amount of 3.0% to 6.0%, Y in an amount of 0.005% to 0.05%, the balance Fe and inevitable impurities, and the inner surface and the projection having an arithmetic average roughness (Sa) of three-dimensional surface roughness that satisfies 1.5 μm≤Sa≤5.0 μm and a skewness (Ssk) of a surface height distribution that satisfies |Ssk|≤0.30.

2. The tube body according to claim 1,
wherein the inner surface has a kurtosis (Sku) of a surface height distribution of the three-dimensional surface roughness that satisfies Sku≥2.5.

3. The tube body according to claim 2,
wherein a metal oxide layer that mainly contains a metal oxide is formed on the inner surface.

4. A reaction tube for manufacturing an olefin, wherein the reaction tube is constituted by the tube body according to claim 2.

5. The tube body according to claim 1,
wherein a metal oxide layer that mainly contains a metal oxide is formed on the inner surface.

6. A reaction tube for manufacturing an olefin, wherein the reaction tube is constituted by the tube body according to claim 1.

* * * * *